UNITED STATES PATENT OFFICE 2,043,855

ALUMINUM WELDING ROD

Fred Keller, New Kensington, Pa., assignor to Aluminum Company of America, Pittsburgh, Pa., a corporation of Pennsylvania No Drawing. Application January 31, 1935, Serial No. 4,307

5 Claims. (Cl. 219—8)

This invention relates to the art of welding metals by depositing metal by fusion with a gas flame or an electric arc. It relates particularly to and has as its chief object the provision of an improved composition of metal for use in joining or welding aluminum, by which term is meant not only commercially pure aluminum but also aluminum base alloys containing 75 per cent or more aluminum.

The compositions coming within the purview of this invention comprise aluminum which contains in addition one of the following metals in small amounts: titanium, chromium, zirconium, molybdenum, tungsten and uranium. Other elements may be present providing they do not adversely affect the beneficial action of the above-mentioned addition agents.

These grain-refining elements are added to aluminum welding rod in small amounts—that is, from .01 to .75 per cent. The preferred amounts are as follows: chromium, .05 to .5 per cent; titanium, .01 to .15 per cent; zirconium, .05 to .5 per cent; molybdenum, .01 to .15 per cent; tungsten, .05 to .25 per cent; uranium, .05 to .25 per cent. These amounts may be added to either aluminum or aluminum base alloys, such as aluminum containing 5 per cent silicon, with the above-stated beneficial results. Larger amounts of grain-refining elements may be added if desired.

Those skilled in the art have been able to effect crude grain refinement in the weld structure in some cases by using a very low welding temperature, it being known that a high temperature was conducive to coarse-grained formation. However, this method is not practical as it is not usually possible to perfect the weld at the low temperatures necessitated by this method, and the results are not certain. Contrary to this technique, the greatest difference in grain refinement of the weld area between a weld made with the rod not containing a grain-refining element in accordance with my invention and one containing such an element, is at high temperatures; a fine-grained weld being obtained with the use of this improved rod at the highest temperature it is possible to use without burning the work. Furthermore, with the use of the welding rod composition of this invention the grain refinement is more perfect under adverse temperature conditions than has been attained by any method heretofore known.

It is known that aluminum melts adsorb or dissolve gases under some conditions at elevated temperatures and that these gases are in a large part again released as the metal solidifies. When making a weld the solidification is very rapid, and the gases contained in the molten metal remain trapped for the most part in the solidified metal, forming a more or less porous structure. These pores or pockets are confined to the grain boundaries, and with a coarse-grained structure constitute flaws of relatively large magnitude which at times seriously affect the strength of the weld. On the other hand, with the fine-grained structure produced in welds contemplated by this invention, the gas pores or pockets are relatively small individually although large in number, are evenly distributed throughout the weld, and have no adverse effects upon its strength.

The following tests exemplify the remarkable benefits accruing from the application of this improved welding rod composition to the welding of aluminum.

*Example 1.*—Two pieces of ¼″ aluminum alloy plate of the following composition: manganese, 1.25 per cent, balance, aluminum of commercial purity containing up to 1 per cent of combined impurities of copper, iron and silicon, were welded with a rod of commercially pure aluminum containing 99 per cent or more aluminum and 1 per cent or less impurities of copper, iron and silicon.

*Example 2.*—Two similar pieces of plate were welded with a rod of commercially pure aluminum as above but containing, in addition, 0.15 per cent titanium. A section was cut from across both of these welds and polished and etched to reveal the grain structure of the weld area.

In the first example the weld was coarsely granular, but in the weld made with the titanium-bearing rod (Example 2) the metal possessed a fine-grained structure and the metal adjacent the weld was similarly affected.

*Example 3.*—A similar set of plates were welded with an aluminum-silicon rod containing titanium of the following composition: 5 per cent silicon, 0.15 per cent titanium, balance, aluminum of commercial purity. The weld area was examined as before and found to be of fine-grained structure throughout. Both welds made with aluminum welding rod containing titanium were found free from large gas holes and were strong and sound in all other respects.

The metals titanium, chromium, zirconium, molybdenum, tungsten and uranium form a group of metals any one of which or combination thereof, when added to an aluminum or aluminum alloy welding rod, imparts the property of producing a fine-grained weld structure and a fine-grained border metal between the metal fused or heated by the welding operation and the unaffected main body portion of the article welded. These elements, when alloyed with aluminum, are substantially non-volatile under the welding heat and neither are they easily oxidized, and are referred to hereinafter in the appended claims as non-volatile grain-refining elements.

I claim:

1. A welding rod consisting of aluminum containing at least one non-volatile grain-refining element selected from a group comprising titanium, chromium, zirconium, molybdenum, tungsten, and uranium, in total amount of 0.01 to 0.75 per cent.

2. A welding rod consisting of aluminum containing about 5 per cent silicon and at least one non-volatile grain-refining element selected from a group comprising titanium, chromium, zirconium, molybdenum, tungsten, and uranium, in total amount of 0.01 to 0.75 per cent.

3. A welding rod consisting of aluminum containing .01 to .5 per cent chromium.

4. A welding rod consisting of aluminum containing .01 to .15 per cent titanium.

5. A welding rod consisting of aluminum containing .05 to .5 per cent zirconium.

FRED KELLER.